(12) United States Patent
Kunz et al.

(10) Patent No.: US 9,499,143 B2
(45) Date of Patent: Nov. 22, 2016

(54) BRAKE SYSTEM FOR A VEHICLE AND METHOD FOR OPERATING A BRAKE SYSTEM OF A VEHICLE

(71) Applicant: Robert Bosch GmbH, Stuttgart (DE)

(72) Inventors: Michael Kunz, Steinheim an der Murr (DE); Stefan Strengert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/605,670

(22) Filed: Jan. 26, 2015

(65) Prior Publication Data

US 2015/0137587 A1     May 21, 2015

Related U.S. Application Data

(62) Division of application No. 13/580,740, filed as application No. PCT/EP2011/051516 on Feb. 3, 2011, now Pat. No. 8,955,922.

(30) Foreign Application Priority Data

Feb. 24, 2010  (DE) ......................... 10 2010 002 275
Jul. 5, 2010   (DE) ......................... 10 2010 030 921

(51) Int. Cl.
    *B60T 8/40*          (2006.01)
    *B60T 8/26*          (2006.01)
    *B60T 8/36*          (2006.01)
    *B60T 8/42*          (2006.01)
    (Continued)

(52) U.S. Cl.
    CPC .............. *B60T 8/267* (2013.01); *B60T 8/3655* (2013.01); *B60T 8/4054* (2013.01); *B60T 8/4072* (2013.01); *B60T 8/4275* (2013.01); *B60T 8/4872* (2013.01); *B60T 13/58* (2013.01); *B60T 13/686* (2013.01)

(58) Field of Classification Search
    CPC ........ B60T 8/267; B60T 8/4072; B60T 8/48; B60T 8/4827; B60T 8/4863; B60T 8/4872
    See application file for complete search history.

(56) References Cited

U.S. PATENT DOCUMENTS 4,395,883 A     8/1983   Melinat
4,674,804 A     6/1987   Burgdorf et al.
(Continued)

FOREIGN PATENT DOCUMENTS

DE     33 45 694       6/1985
DE     36 24 344       1/1988
(Continued)

OTHER PUBLICATIONS

EPO translation DE 4029793 A1, Kirstein, Mar. 1992.*

*Primary Examiner* — Thomas J Williams
(74) *Attorney, Agent, or Firm* — Norton Rose Fulbright US LLP; Gerard Messina

(57) ABSTRACT

A vehicle brake system and method for operating same, having a master brake cylinder, a brake medium reservoir, and a first brake circuit, connected via a reservoir line to the brake reservoir, having at least one first wheel brake cylinder, a first wheel inlet valve associated with the first brake cylinder, a first pump, by which a first brake medium volume is pumpable from the reservoir line through the open first wheel inlet valve into the first brake cylinder, a continuously adjustable first wheel outlet valve, by which a first brake medium displacement from the first cylinder into the brake reservoir is controllable, and a connecting line having a spring-loaded non-return valve, via which a delivery side of the first pump is connected to the brake reservoir, a brake medium displacement from the brake reservoir to the delivery side of the first pump being prevented by the spring-loaded non-return valve.

10 Claims, 3 Drawing Sheets

(51) Int. Cl.
  *B60T 8/48* (2006.01)
  *B60T 13/58* (2006.01)
  *B60T 13/68* (2006.01)

(56) References Cited

U.S. PATENT DOCUMENTS

| | | | |
|---|---|---|---|
| 5,156,447 A | 10/1992 | Hummel et al. | |
| 5,207,485 A | 5/1993 | Troster | |
| 5,236,256 A | 8/1993 | Schmidt et al. | |
| 5,342,120 A | 8/1994 | Zimmer et al. | |
| 5,397,174 A * | 3/1995 | Willmann | B60T 8/4872 303/113.2 |
| 5,769,509 A | 6/1998 | Feigel et al. | |
| 6,126,248 A * | 10/2000 | Kawahata | B60T 8/3655 303/114.1 |
| 6,761,418 B2 * | 7/2004 | Nakamura | B60T 8/321 303/113.1 |
| 7,021,727 B2 | 4/2006 | Kamiya et al. | |
| 7,059,691 B2 * | 6/2006 | Tsunehara | B60L 7/26 303/15 |
| 8,029,072 B2 * | 10/2011 | Miyazaki | B60T 8/3275 303/113.1 |
| 2002/0158510 A1 | 10/2002 | Kobayashi et al. | |
| 2009/0077963 A1 * | 3/2009 | Ganzel | B60T 8/34 60/562 |
| 2011/0108375 A1 * | 5/2011 | Wuerth | B60T 8/1766 188/106 P |

FOREIGN PATENT DOCUMENTS

| | | |
|---|---|---|
| DE | 40 09 640 | 6/1991 |
| DE | 40 29 793 | 3/1992 |
| DE | 42 13 740 | 10/1993 |
| DE | 195 34 451 | 3/1997 |
| DE | 198 25 278 | 12/1999 |
| DE | 10 2004 044599 | 4/2005 |
| DE | 10 2005 061 543 | 7/2007 |
| DE | 10 2005 061543 | 7/2007 |
| DE | 10 2006 046935 | 4/2008 |
| DE | 10 2008 002345 | 12/2009 |
| EP | 1 470 979 | 10/2004 |
| JP | 61-232954 | 10/1986 |
| JP | 62-173364 | 7/1987 |
| JP | 7-502469 | 3/1995 |
| JP | 2000-354302 | 12/2000 |
| JP | 2005-170287 | 6/2005 |
| JP | 2005-199744 | 7/2005 |
| JP | 2007-2710372 | 8/2007 |
| WO | WO 89/01890 | 3/1989 |
| WO | WO 93/11009 | 6/1993 |
| WO | WO 94/25322 | 11/1994 |
| WO | WO 2008/058985 | 5/2008 |
| WO | WO 2009/089944 | 7/2009 |
| WO | WO 2009/149977 | 12/2009 |

\* cited by examiner

BRAKE SYSTEM FOR A VEHICLE AND METHOD FOR OPERATING A BRAKE SYSTEM OF A VEHICLE

CROSS-REFERENCE TO RELATED APPLICATIONS

The present application is a continuation application of U.S. patent application Ser. No. 13/580,740, filed on Nov. 15, 2012, which is a national phase to International Application No. PCT/EP2011/051516, filed Feb. 3, 2011, and claims priority to German Patent Application No. 10 2010 030 921.4, filed Jul. 5, 2010, and German Patent Application No. 10 2010 002 275.6, filed Feb. 24, 2010, all of which are hereby incorporated by reference in their entireties.

FIELD OF THE INVENTION

The present invention relates to a brake system for a vehicle. Furthermore, the present invention relates to a method for operating a brake system of a vehicle.

BACKGROUND INFORMATION

Electric and hybrid vehicles have a brake system configured for recuperative braking including an electric motor operated as a generator during recuperative braking. Following an intermediate storage, the electrical energy recovered during recuperative braking may be used for accelerating the vehicle. This makes it possible to reduce power loss, which a conventional vehicle incurs when braking frequently in travel, energy consumption and pollutant emission of the electric or hybrid vehicle.

However, operating the electric motor, for example the electric drive motor, in generator mode typically requires a certain minimum speed of the vehicle. A recuperative brake system is thus frequently unable to exert a regenerative braking torque on the wheels of the vehicle for as long as it takes for the moving vehicle to come a standstill. For this reason, a hybrid vehicle often has, in addition to the recuperatively operated electric motor, also a hydraulic brake system, which makes it possible, at least in a low speed range, to compensate for the lack of braking action of the recuperative brake. In this case it is possible to apply the entire braking torque via the hydraulic brake system even when the electrical energy store is full, which is when the recuperative brake usually exerts no braking torque on the wheels.

On the other hand, in some situations, it is desirable to exert the lowest possible hydraulic braking force on the wheels in order to achieve a high degree of recuperation. For example, following shifting operations, the decoupled generator is often activated as a recuperative brake in order to ensure reliable charging of the intermediate store and high energy savings.

Generally, a driver may prefer a total braking torque of his vehicle, which corresponds to his actuation of a brake input element such as his brake pedal actuation, for example, irrespective of an activation or deactivation of the recuperative brake. For this reason, some electric and hybrid vehicles have an automatic system, which is supposed to adapt the braking torque of the hydraulic brake system to the current braking torque of the recuperative brake in such a way that a desired total braking torque is maintained. The driver thus does not have to take on the task of the delay regulator himself, by adapting the braking torque of the hydraulic brake systems via an appropriate actuation of the brake input element to the current braking torque of the recuperative brake. Examples for such an automatic system are brake-by-wire brake systems, in particular EHB systems. Due to their complex electronics, mechanics and hydraulics, however, brake-by-wire brake systems are relatively expensive.

As an alternative to brake-by-wire brake systems, DE 10 2008 002 345 A1 discusses a brake system, which includes a first brake circuit decoupled from a master brake cylinder and connected to a brake medium reservoir. This first brake circuit has a wheel axle assigned to it, onto which a recuperative braking torque of an electric motor operated as a generator may be applied. Two additional brake circuits are coupled to the master brake cylinder in such a way that the driver is able to brake into them directly and thus exert a direct hydraulic braking torque onto the wheels associated with the two additional brake circuits.

SUMMARY OF THE INVENTION

The exemplary embodiments and/or exemplary methods of the present invention provide a brake system for a vehicle having the features described herein and a method for operating a brake system of a vehicle having the features described herein.

The exemplary embodiments and/or exemplary methods of the present invention provide for a brake system, in which the at least one first wheel associated with the first brake circuit is brakable at a preferred first hydraulic braking torque via an actuation of the first pump and/or a switching of the switchable valves of the first brake circuit independently of a pressure in the interior of the master brake cylinder. Thus the first brake circuit of the brake system may be used in a simple manner actively to set at least the first hydraulic braking torque exerted on the first wheel in such a way that a desired total braking torque may be maintained at least on the first wheel.

For example, at least the first hydraulic braking torque exerted on the first wheel may be set actively so as to mask a recuperative braking torque that is variable over time. This creates the possibility of ascertaining with the aid of a sensor or by estimation the total braking torque desired by the driver and/or by an automatic control system of the vehicle, and the current recuperative braking torque exerted by the recuperative brake. By optionally taking into account a hydraulic braking torque exerted via at least one additional brake circuit on at least one wheel of the vehicle that is not associated with the first brake circuit, it is possible to ascertain the difference that still exists between the exerted braking torques and the desired total braking torque. An hydraulic braking torque corresponding to the ascertained difference may subsequently be actively exerted via the first brake circuit on the at least one associated (first) wheel. This renders possible a masking of the recuperative braking torque, without the driver having to expend additional work for this purpose. No expensive electronics are required for performing the method steps described in this paragraph. A sufficient recuperation efficiency is thus ensured at tenable costs when using the exemplary embodiments and/or exemplary methods of the present invention.

However, the exemplary embodiments and/or exemplary methods of the present invention are not limited to an application in an electric or hybrid vehicle. For example, a transversal acceleration-dependent brake-force distribution may also be implemented by the exemplary embodiments and/or exemplary methods of the present invention. In the case of a transversal acceleration-dependent brake-force distribution, the brake force at some of the wheels of the vehicle, which may be at the two rear-axle wheels, is apportioned in accordance with a vertical force that occurs when traveling around a curve. In this manner, the frictional coefficient of the wheels, especially the frictional coefficient of the two rear wheels, may be adapted to the transversal acceleration. This permits more stable braking of the vehicle in curves. To ascertain the hydraulic braking torque that is to be set actively via the first brake circuit, a transversal acceleration ascertained by a sensor device may be used.

In addition, the exemplary embodiments and/or exemplary methods of the present invention may be used for dynamic braking in curves. In the case of dynamic curve braking, the braking force at a wheel on the inside of the curve is increased relative to the braking force at a wheel on the outside of the curve. This achieves a more dynamic handling performance.

In addition, the exemplary embodiments and/or exemplary methods of the present invention may also be used for a more advantageous braking when driving in reverse. In particular, by increasing the braking force at the rear axle, a better brake-force distribution is set for driving in reverse. In this context, one also speaks of a reverse brake-force distribution. Most notably, this permits a substantially more stable braking performance in the case of slow reverse travel on a downgrade.

At the same time, the exemplary embodiments and/or exemplary methods of the present invention may improve the feeling on the pedal by decoupling the first brake circuit such that the driver no longer has to control the first brake circuit directly via a force exerted on the brake pedal. The pedal travel may also be shortened in this manner.

The exemplary embodiments and/or exemplary methods of the present invention additionally may provide an easy-to-operate and cost-effective alternative to a conventional brake-by-wire brake system, which is very advantageous in particular for rear-wheel-drive or all-wheel-drive vehicles. However, the exemplary embodiments and/or exemplary methods of the present invention may also be used for front-wheel drive featuring a by-wire front axle.

A particular advantage of the brake system described here is the small number of required electrically controllable valves. In this context, a controllable valve may be understood as a valve, which is switchable via an electrical control signal or switching signal at least into an open and into a closed state. In particular because of the continuously adjustable/regulatable design of the first wheel outlet valve and because of the advantageous positioning of the non-return valve, no additional electrically controllable valve, in particular no additional continuously regulatable valve, is necessary. This reduces the costs of developing the advantageous first brake circuit. Using the first brake circuit described here at the same time makes it possible to reduce the total number of controllable valves of a brake system. As shown more precisely below, this also reduces the costs for an electronic system of the brake system, which is suitable for controlling/regulating all required valves that are electrically controllable/switchable at least into the open and the closed state.

It should be noted that the brake medium reservoir is not to be understood as the master brake cylinder. Instead, the brake medium reservoir may be understood as a brake medium volume or a brake medium container, the internal pressure of which is settable irrespective of an internal pressure of the master brake cylinder or corresponds to a definitively specified pressure such as atmospheric pressure, for example.

In one advantageous specific embodiment, the first brake circuit comprises a second wheel brake cylinder having an associated second wheel inlet valve and a continuously adjustable (regulatable) second wheel outlet valve, a second brake medium volume being able to be pumped by the first pump from the reservoir line through the open second wheel inlet valve into the second wheel brake cylinder and a second brake medium displacement from the second wheel brake cylinder into the brake medium reservoir being controllable using the continuously adjustable second wheel outlet valve. Such a first brake circuit, by which a first hydraulic braking torque and a second hydraulic braking torque are exertable in a wheel-specific manner on a first wheel and a second wheel of a vehicle, makes it possible to decouple an axle, in particular the rear axle, from the master brake cylinder. The use of such a first brake circuit, however, is not limited to the application in vehicles having an axle-wise brake-circuit configuration. At the same time, such a first brake circuit requires only a total of four valves that are switchable via an electrical control signal/switching signal at least into an open state and into a closed state. This reduces the costs for the first brake circuit.

In one advantageous development, the brake system includes at least one second brake circuit having a third wheel brake cylinder, the second brake circuit being hydraulically connected via a first line to the master brake cylinder in such a way that via a first pressure increase in an inner volume of the master brake cylinder it is possible to produce a second pressure increase in an inner volume of the third wheel brake cylinder. The driver thus has the possibility of breaking directly into the second brake circuit. This automatically ensures an advantageous feeling on the pedal for the driver when actuating a brake pedal coupled to the master brake cylinder, or a corresponding brake input element. In addition, the brake system having the first brake circuit is compatible with additional conventional brake circuits. In this connection, as will be explained in more detail below, the applicability of the brake system is not limited to vehicles having an axle-wise brake circuit configuration.

The brake system may include a third brake circuit having a fourth wheel brake cylinder, the third brake circuit being hydraulically connected via a second line to the master brake cylinder in such a way that via the first pressure increase in the inner volume of the master brake cylinder it is possible to produce additionally a third pressure increase in an inner volume of the fourth wheel brake cylinder. In spite of its advantageous decoupling of an axle associated with the first brake circuit, such a brake system may be used in a vehicle having an X brake circuit configuration. This is a significant advantage over brake systems having a decouplable axle, which, however, may only be used in vehicles having an axle-wise brake circuit configuration. In particular, using the brake system described here makes it possible, with comparatively little effort, to compensate reliably for a failure of one of the brake circuits even in the case of an X brake circuit configuration.

The brake system may have a brake booster, which makes it possible to perform a power braking operation and/or exert a boost force in addition to a driver braking force on at least one adjustable component of the master brake cylinder. The brake system may include a continuously regulatable and/or continuously controllable brake booster. A continuously regulatable and/or continuously controllable brake booster may be understood as an active brake booster. Such a design of the brake booster ensures the elimination of at least one valve, in particular of the second and/or third brake circuit, by operating the brake booster accordingly.

The second brake circuit may have exactly two controllable valves and/or the third brake circuit has exactly two controllable valves. The entire brake system may advantageously have exactly eight controllable valves, which are controllable via an electrical signal provided by a control device of the brake system into an open state and into a closed state. Such a brake system may thus be operated using a cost-effective control device.

For example, the second brake circuit may include: A third wheel inlet valve associated with the third wheel brake cylinder, a second pump, by which a third brake medium volume may be pumped from the master brake cylinder through the open main switch valve and the open third wheel inlet valve into the third wheel brake cylinder, a first storage chamber and a third wheel outlet valve, by which a brake medium displacement from the third brake medium cylinder into the first storage chamber is controllable. Such a second brake circuit allows for an active buildup of an additional hydraulic brake pressure in the third wheel brake cylinder. This makes it easier to brake a vehicle forcefully. Furthermore, this also makes it possible to omit equipping the second brake circuit with a main switch valve and/or a switchover valve.

Likewise, the second brake circuit may additionally include a main switch valve and/or a switchover valve. The use of a brake booster is thus possible in addition to equipping the second brake circuit with a main switch valve and/or a switchover valve.

The third brake circuit may be constructed in accordance with the second brake circuit. In this manner, an additional hydraulic brake pressure may be actively built up in the fourth wheel brake cylinder as well.

Advantageously, at least the first pump and the second pump may be situated on a common shaft of a motor. If applicable, a third pump of the third brake circuit may also be situated on the common shaft of the motor. This reduces the required number of motors in a development of the brake system that has at least two pumps.

The brake system may in particular have exactly twelve controllable valves, which are controllable at least into an open state and into a closed state via an electrical signal provided by a control device of the brake system. The limitation of the valves required by the brake system, which are electrically switchable at least into the open state and into the closed state, to the number of twelve reduces the requirements on an electronics suited as a control device.

The brake system may furthermore include a generator, by which a first generator braking torque is exertable on a first wheel associated with the first wheel brake cylinder and a second generator braking torque is exertable on a second wheel associated with the second wheel brake cylinder. In particular, in such a development of the brake system, a sufficient recuperation efficiency with optimized masking processes is realized at tenable costs.

In another advantageous development, the control device of the brake system may be configured to receive a setpoint difference, specified by a vehicle component, of a hydraulic sum braking torque made up of a first hydraulic braking torque exertable by the first wheel brake cylinder on the first wheel and a second hydraulic braking torque exertable by the second wheel brake cylinder on the second wheel of the vehicle, and, if the first wheel inlet valve is in an open state, to control the first wheel outlet valve in such a way that the first hydraulic braking torque is modifiable by the setpoint difference, and, if the first wheel inlet valve is in a closed state and the second wheel inlet valve is in an open state, to control the second wheel outlet valve in such a way that the second hydraulic braking torque is modifiable by the setpoint difference. This allows for a reliable adaptation of the hydraulic sum braking torque to a preferred setpoint total braking torque and/or to an advantageous setpoint braking torque distribution on all wheels.

The advantages described in the above paragraphs are also ensured for a vehicle having a corresponding braking system.

The advantages described above are also realizable using a corresponding method for braking a vehicle.

Additional features and advantages of the exemplary embodiments and/or exemplary methods of the present invention are explained below with reference to the figures.

DETAILED DESCRIPTION

Figure 1:
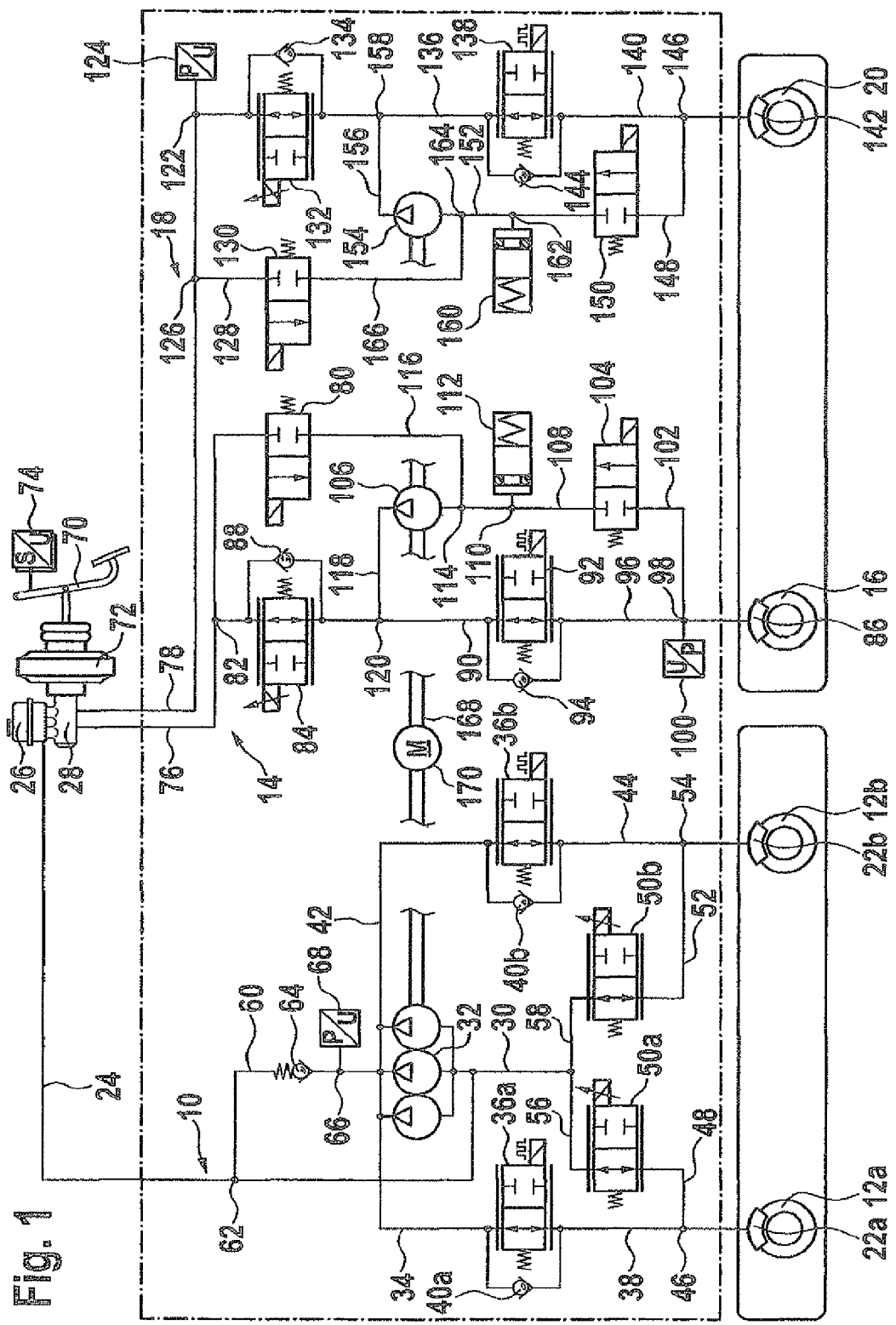
FIG. 1 shows a circuit diagram of a first specific embodiment of the brake system.

FIG. 1 shows a circuit diagram of a first specific embodiment of the brake system.

The brake system shown schematically in FIG. 1 is usable not only in an electric or hybrid vehicle. Instead, the brake system may also be used in a vehicle, for example, to ensure a preferred brake force distribution on the wheels of the vehicle when braking during cornering and/or driving in reverse. Indications of a usability of the brake system in an electric or hybrid vehicle are to be understood merely by way of example.

The brake system comprises a first brake circuit 10 for braking two wheels 12a and 12b situated on a common axle, a second brake circuit 14 for braking a third wheel 16 and a third brake circuit 18 for braking a fourth wheel 20. The applicability of the brake system, however, is not limited to an axle-wise arrangement of the two wheels 12a and 12b. Alternatively, wheels 12a and 12b may also be arranged on one side of an associated vehicle or diagonally on the vehicle.

It should also be noted that the illustrated brake system is not limited to the fixed number of four wheels 12a, 12b, 16 and 20. Instead, the brake system may be expanded in such a way that a greater number of wheels are brakable. In particular, the brake system may in this case have at least two brake circuits that correspond to first brake circuit 10.

In a specific embodiment, wheels 12a and 12b are the rear wheels of a vehicle. By actively building up a brake pressure, as described below, for braking the two wheels 12a and 12b, it is possible, particularly in this case, to brake the vehicle forcefully, without the vehicle beginning to skid.

In the illustrated specific embodiment, first brake circuit 10 comprises a first wheel brake cylinder 22a, which is configured to exert a first hydraulic braking torque on the associated first wheel 12a. A second hydraulic braking torque is exertable on second wheel 12b by a second wheel brake cylinder 22b of first brake circuit 10. As will be explained below, using the two wheel brake cylinders 22a and 22b makes it possible to exert different hydraulic braking torques on wheels 12a and 12b in situations, in which this is advantageous.

For the purpose of providing a brake medium, for example a brake fluid or a brake gas, first brake circuit 10 is coupled to a brake medium reservoir 26 via at least one reservoir line 24. First brake circuit 10 thus does not have the conventional hydraulic connection to a master brake cylinder 28. Brake medium reservoir 26 may be connected to master brake cylinder 28 via at least one supply opening such as a snifting bore, for example. Alternatively, brake medium reservoir 26 may also be developed separately from master brake cylinder 28 and without such a supply opening.

Reservoir line 24 opens out in a line 30, to the first end of which an intake side of a first pump 32 is coupled. First pump 32 may be a three-piston pump for example. Instead of a three-piston pump, a pump having a different number of pistons, for example a single-piston pump, an asymmetrical pump or a gear pump may also be used as first pump 32. From a delivery side of first pump 32, a line 34 runs to a first wheel inlet valve 36*a*, which is connected to first wheel brake cylinder 22*a* via a line 38. First wheel inlet valve 36*a* is switchable at least into an open state and into a closed state using an electrical control signal/switching signal. A bypass line having a non-return valve 40*a* is situated in parallel to first wheel inlet valve 36*a*. Non-return valve 40*a* is oriented so as to prevent a displacement of brake medium through the bypass line in a direction from line 34 to line 38 or from first pump 32 to first wheel brake cylinder 22*a*.

The delivery side of first pump 32 is connected via a line 42 to a second wheel inlet valve 36*b*, which likewise has a parallel bypass line having a second non-return valve 40*b*. From second wheel inlet valve 36*b*, a line 44 runs to second wheel brake cylinder 22*b*. Non-return valve 40*b* is oriented so as to prevent a displacement of brake medium through the bypass line in a direction from line 42 to line 44 or from first pump 32 to second wheel brake cylinder 22*b*.

A junction point 46 is situated within line 38, from which a line 48 leads to a first wheel outlet valve 50*a*. Via a line 52, a second wheel outlet valve 50*b* is connected to a junction point 54 developed within line 44. First wheel outlet valve 50*a* and second wheel outlet valve 50*b* are developed as continuously adjustable/regulatable valves. Thus it is possible to switch wheel outlet valves 50*a* and 50*b*, in addition to an open state and a closed state, also into at least one intermediate state. The advantages of such a development of wheel outlet valves 50*a* and 50*b* will be explained in more detail below.

A line 56 leads from first wheel outlet valve 50*a* to a second end of line 30 facing away from first pump 32, into which a line 58 from second wheel outlet valve 50*b* also opens out. Another line 60 leads from the delivery side of first pump 32 to a junction point 62 situated within reservoir line 24. A preferably spring-loaded non-return valve 64 is situated within line 60, which is oriented so as to prevent a brake medium displacement from reservoir line 24 to the delivery side of first pump 32. Optionally, a pressure sensor 68 may be coupled via another junction point 66 within line 60.

The wheel inlet valves 36*a* and 36*b* by using an electric control signal and the continuously adjustable/regulatable wheel outlet valves 50*a* and 50*b* of first brake circuit 10 may be developed as valves that are open when no current is applied. The brake system described here is, however, not limited to such a development. By controlling wheel inlet valves 36*a* and 36*b*, the continuously adjustable/regulatable wheel outlet valves 50*a* and 50*b*, and first pump 32, it is possible to set the pressure in first wheel brake cylinder 22*a* and in second wheel brake cylinder 22*b* in a wheel-specific manner and in a manner that is decoupled from or independent of an actuation of a brake input element by the driver. For this purpose, it is also possible to use pressure sensor 68, the positioning of which is to be understood merely by way of example.

First brake circuit 10 does not require a switchover valve in order actively to build up a wheel-specific brake pressure in wheel brake cylinders 22*a* and 22*b*. This reduces to four the number of valves required for building up a first hydraulic braking torque acting on first wheel 12*a* and a second hydraulic braking torque acting on second wheel 12*b* (valves that are controllable/switchable by an electrical control signal/switching signal into at least an open state and a closed state). Due to the low number of electrically controllable/switchable valves required for first brake circuit 10, the brake system may be expanded by at least one additional brake circuit having at least one additional electrically controllable/switchable valve, without complex/expensive electronics having to be provided for switching the valves.

Due to the provision and development of second brake circuit 14 and third brake circuit 18, the brake system described here makes it possible to brake wheels 16 and 20 directly in addition to a brake pressure buildup that is independent of the driver or decoupled from the brake pedal. For this purpose, a brake pedal 70 is coupled to master brake cylinder 28. As an alternative or a supplement to brake pedal 70, a differently developed brake input element may be coupled to master brake cylinder 28. Advantageously, a brake booster 72 is additionally coupled to master brake cylinder 28 and/or to brake pedal 70 so as to be able, with the aid of brake booster 72, to boost a pressure in an interior of master brake cylinder 28, which may be built up by actuating brake pedal 70. Brake booster 72 may be an electromechanical brake booster 72 and/or an hydraulic brake booster 72, for example. Brake booster 72 may be able to be continuously regulated or controlled.

A sensor 74 may be situated on brake pedal 70 in such a way that an actuation of brake pedal 70 by the driver is detectable by sensor 74. Sensor 74 may be configured to supply a braking force signal and/or braking distance signal, corresponding to the actuation of brake pedal 70, to an evaluation electronics (not shown). Sensor 74 may be, for example, a pedal-travel sensor, a booster diaphragm-travel sensor and/or a rod-travel sensor. However, the practicability of sensor 74 is not limited to the examples enumerated here.

A first feed line 76 for second brake circuit 14 and a second feed line 78 for third brake circuit 18 are attached to master brake cylinder 28. This allows for the driver to brake directly into second brake circuit 14 and into third brake circuit 18.

First feed line 76 extends between master brake cylinder 28 and a first main switching valve 80 (high pressure switching valve) of second brake circuit 14. In addition, a first switchover valve 84 is connected via a branch point 82 to first feed line 76. A brake fluid stream starting from master brake cylinder 28 may thus flow via feed line 76 optionally via first main switching valve 80 and/or via first switchover valve 84 into a direction of a third wheel brake cylinder 86 of second brake circuit 14, which is associated with third wheel 16 of the vehicle. A bypass line having a non-return valve 88 is configured in parallel to switchover valve 84. In the event of a malfunction of switchover valve 84, which otherwise would be able to interrupt the hydraulic connection between master brake cylinder 28 and wheel-brake cylinder 86, non-return valve 88 ensures a continuation of the hydraulic connection oriented in a direction from master brake cylinder 28 to third wheel brake cylinder 86. Thus it is possible to activate a caliper associated with third wheel brake cylinder 86 even during a failure of switchover valve 84 by actuating brake pedal 70.

A line 90 runs from a side of switchover valve 84 facing away from first feed line 76 to a third wheel inlet valve 92. A bypass line having a non-return valve 94 runs in parallel to third wheel inlet valve 92.

Additionally, third wheel inlet valve 92 is connected to third wheel brake cylinder 86 via a line 96. Optionally, it is also possible for a pressure sensor 100 to be connected to line 96 via a junction point 98. A pressure in the interior of second brake circuit may be ascertained using pressure sensor 100.

It is also possible for a line 102 to open out into junction point 98, at the end of which a third wheel outlet valve 104 is situated. As a cost-effective valve, third wheel outlet valve 104 may be switchable only into an open and into a closed state.

Second brake circuit 14 also has a second pump 106, the intake side of which is connected via a line 108 to third wheel outlet valve 104. A first storage chamber 112 is coupled to line 108 via a junction point 110. A line 116, to the end of which main switching valve 80 is coupled, opens out into another junction point 114 within line 108. Furthermore, a line 118 connects a delivery side of second pump 106 to a junction point 120 within line 90.

First switchover valve 84 and third wheel inlet valve 92 of second brake circuit 14 may be developed as valves that are open when no current is applied. In this case, a development of first main switching valve 80 and of wheel outlet valve 104 as valves that are closed when no current is applied is advantageous.

Third brake circuit 18 associated with fourth wheel 20 may be developed in accordance with second brake circuit 14. For example, it is possible for another optional pressure sensor 124 to be connected to second feed line 78 via a junction point 122. A pressure in the interior of third brake circuit 18 may be ascertained using pressure sensor 124. Via another junction point 126, a line 128 may be connected to feed line 78, which leads from junction point 126 to a second main switching valve 130. Third brake circuit 18 may also have a second switchover valve 132, which is coupled to junction point 122. A bypass line having a non-return valve 134 may run in parallel to switchover valve 132. Regarding the orientation of non-return valve 134, reference is made to the example of second brake circuit 14. A line 136 may lead from second switchover valve 132 to a fourth wheel inlet valve 138. Fourth wheel inlet valve 138 is connected via a line 140 to a wheel brake cylinder 142 associated with fourth wheel 20. A bypass line having a non-return valve 144 may run in parallel to fourth wheel inlet valve 138. It is advantageous if non-return valve 144 is oriented so as to prevent a brake medium flow through the bypass line in a direction from line 136 to line 140 or from second switchover valve 132 to fourth wheel brake cylinder 142.

In line 140 connecting fourth wheel inlet valve 138 to fourth wheel brake cylinder 142, a junction point 146 may be situated, into which a line 148 having a fourth wheel outlet valve 150 at its end opens out. Another line 152 may lead from fourth wheel outlet valve 150 to an intake side of a third pump 154. Via a line 156, the delivery side of third pump 154 is connected to a junction point 158 situated in line 136. Furthermore, third brake circuit 18 has a second storage chamber 160, which is coupled via a junction point 162 to line 152. Another junction point 164 in line 152 connects main switching valve 130 of third brake circuit 18 to third pump 154 via a line 166.

Second switchover valve 134 and fourth wheel inlet valve 138 may be configured as valves that are open when no current is applied. In this case it is advantageous if second main switching valve 130 and fourth wheel outlet valve 150 are configured as valves that are closed when no current is applied. The practicability of third brake circuit 18, however, is not limited to this development of valves 130, 134, 138 and 150.

As an alternative to the specific embodiment shown in FIG. 1, third brake circuit 18 may be developed in such a way that it has significant differences with respect to second brake circuit 14. The exemplary embodiments shown here for brake circuits 14 and 18 are to be understood merely by way of example.

Pumps 106 and 154 of the two brake circuits 14 and 18 may be single-piston pumps. As an alternative to the use of a single-piston pump for pump 106 and/or 154, a three-piston pump, an asymmetrical pump and/or a gear pump may be used as well. Advantageously, pumps 32, 106 and 154 may be situated on a common shaft 168 of a motor 170. This reduces the costs for a brake system having at least two pumps 32, 106 and 154.

Second brake circuit 14 and third brake circuit 18 are hydraulically connected to master brake cylinder 28 via lines 76 and 78 in such a way that via a first pressure increase in an interior volume of master brake cylinder 28 a second pressure increase is producible in an interior volume of third wheel brake cylinder 86 and a third pressure increase in an interior volume of fourth wheel brake cylinder 142 are producible. Thus the driver is able to brake directly into the two brake circuits 14 and 18 by actuating brake pedal 70. However, master brake cylinder 28 is hydraulically connected in this manner only with wheel brake cylinder 86 and fourth wheel brake cylinder 142.

In the specific embodiment shown, third wheel brake cylinder 86 and fourth wheel brake cylinder 142 are each equipped with its own main switching valve 80 or 130 and its own switchover valve 84 or 132 in addition to wheel inlet valves 92 and 138 and wheel outlet valves 104 and 150. The functionality of the two brake circuits 14 and 18 and the valves 80, 84, 92, 104, 130, 134, 138 and 150 situated within them correspond to a classic ESP system, each of the two brake circuits 14 and 18 comprising only one wheel brake.

Furthermore, a particular procedure is described for operating the brake system having brake circuits 10, 14 and 18:

When no brake is activated, valves 36*a*, 36*b*, 50*a*, 50*b*, 80, 84, 92, 104, 130, 134, 138 and 150 of brake circuits 10, 14 and 18 may be not supplied with current. Normally, a current signal is supplied to the valves from a control device/control electronics (not sketched) of the brake system only in situations in which the driver actuates brake pedal 70.

If the driver actuates brake pedal 70, then he brakes via master brake cylinder 28 directly into the two brake circuits 14 and 18, which may be associated with the front axle of this wheel. The braking request of the driver may be provided via sensor 74, for example as a braking force signal and/or as a braking distance signal, to an evaluation device of the control device. Subsequently, a braking pressure may be actively set by the control device in wheel brake cylinders 22*a* and 22*b* of first brake circuit 10 in accordance with, or by taking into account the driver's braking request. For this purpose, first pump 32 and the two wheel outlet valves 50*a* and 50*b* may be activated in accordance with the braking pressure desired in wheel brake cylinders 22*a* and 22*b* of the first brake circuit. The braking pressure in wheel brake cylinders 12*a* and 12*b* may be set by delta-p control of pressure-regulating outlet valve 50*a* or 50*b*. For this purpose, pressure sensor 68 may be coupled to first brake circuit 10. As an alternative, a pressure sensor may also be situated on at least one of wheels 12a or 12b.

When debraking, i.e. when the driver decreases the actuation of brake pedal 70, at least one of wheel outlet valves 50a and 50b of the first brake circuit is opened in accordance with the decreasing braking input. Thus the brake medium volume is able to flow back into brake medium reservoir 26 via the at least one open wheel outlet valve 50a and 50b.

It should be noted that in the design of brake circuits 10, 14 and 18 shown here, an operation of first pump 32 of first brake circuit 10 is no longer connected with an automatic volume delivery in the other brake circuits 14 and 18. Although in this case pumps 106 and 154 are operated along on account of their common position on shaft 90, it is possible to prevent an undesired additional pressure buildup in wheel brake cylinders 86 and 142 of brake circuits 14 and 18 with the aid of closed main switching valves 80 and 130. Thus, if desired, a pressure buildup may be actively performed exclusively in wheel brake cylinders 22a and 22b of first brake circuit 10 by operating motor 170. At the same time, if desired, it is possible for an active pressure buildup to occur in brake circuits 14 and 18, even without an actuation of brake pedal 70 on the part of the driver, by opening at least one of main switching valves 80 and 130 and operating pumps 106 or 154.

If the braking pressure is to be increased in at least one brake cylinder 86 or 142 using pump 106 or 154 while at the same time maintaining or decreasing the existing hydraulic braking torques on the two wheels 12a and 12b, then both wheel inlet valves 36a and 36b of first brake circuit 10 are closed while first pump 32 is running. In this case, an increased pressure is able to build up between the delivery side of first pump 32 and the two wheel inlet valves 36a and 36b. By opening an advantageously spring-loaded non-return valve 64 and returning the delivered volume into brake medium reservoir 26, damage to the hydraulic unit may be prevented in this case, however.

The procedure described in the upper paragraphs may be applied for example for masking a generator braking torque of a generator coupled to the axle of wheels 12a and 12b:

Using sensor 74, it is possible to determine what total braking torque the driver desires in light of the current traffic situation. At the same time, it is possible to ascertain what generator braking torque is currently exerted on the axle associated with wheels 12a and 12b by the generator. Via an evaluation device (not shown) of the control device/electronics, it is subsequently possible to calculate a braking torque difference between the requested total braking torque (possibly the hydraulic braking torque exerted on wheels 16 and 20) and the generator braking torque exerted on wheels 12a and 12b. The calculated braking torque difference may be set actively on wheels 12a and 12b by operating pump 32 and controlling wheel inlet valves 36a and/or 36b and continuously regulatable/controllable wheel outlet valves 50a and 50b.

Thus it is possible to adapt the hydraulic braking torques exerted on wheels 12a and 12b to the generator braking torque, which is known, but which is not constant over time. This may be called a masking of the generator braking torque, it being reliably ensured that, in spite of the fluctuations of the generator braking torque over time, a desired total braking torque, which may correspond to the driver's actuation of the brake pedal, is maintained on wheels 12a and 12b. The masking of the generator braking torque is not noticeable for the driver.

Using the procedure described in the upper paragraphs, it is also possible to set a preferred brake-force distribution on wheels 12a, 12b, 16 and 20 of the vehicle when braking while cornering and/or when driving in reverse. Examples of this include the transversal acceleration-dependent brake-force distribution already referred to, the dynamic curve braking, and/or the increase in the brake force at the rear axle when braking during travel in reverse.

Below a particularly advantageous possibility is described for setting a specified setpoint difference of a hydraulic sum braking torque of a first hydraulic braking torque exerted by first wheel brake cylinder 22a on first wheel 16a and a second hydraulic braking torque exerted by second wheel brake cylinder 22b on second wheel 12b, or an input corresponding to the setpoint difference:

For this purpose, having received the setpoint difference, the control device may be configured in such a way that it ascertains whether first wheel inlet valve 36a and/or second wheel inlet valve 36b are controlled in an open or in a closed state. In particular, the control unit may be configured in such a way that, if first wheel inlet valve 36a is in an open state, it controls first wheel outlet valve 50a in such a way that the first hydraulic braking torque is modifiable by the setpoint difference. Accordingly, the control unit may be configured in such a way that, if first wheel inlet valve 36a is in a closed state and second wheel inlet valve 36b is in an open state, it controls second wheel outlet valve 50b in such a way that the second hydraulic braking torque is modifiable by the setpoint difference. The setpoint difference may be a positive or a negative difference of the hydraulic sum braking torque.

This control of the two continuously regulatable/controllable wheel outlet valves 50a and 50b may also be described in such a way that in the event of a complete closure of a wheel inlet valve 36a or 36b associated with a wheel brake cylinder 22a or 22b, the wheel brake pressure is controlled via the wheel outlet valve 50a or 50b associated with the other wheel brake cylinder 22a or 22b. Such a development of the control device ensures in particular that, even when first wheel inlet valve 36a is closed due to an ABS control action, the pressure setting for a desired sum braking torque of the first hydraulic braking torque and the second hydraulic braking torque may be adjusted by operating the second wheel outlet valve 50b. The functionality of the regulatable pressure setting for the first brake circuit may thus transition from first wheel outlet valve 50a to second wheel outlet valve 50b. Even a possibly necessary complete debraking may occur via second wheel outlet valve 50b. Accordingly, the reverse procedure in the case of an ABS control is also implementable by second wheel inlet valve 36b. (The ABS control may be implemented on at least one of wheels 16 and/or 20 in a conventional manner.)

The operation of the brake system, however, is not limited to this control strategy of the two regulatable/controllable wheel outlet valves 50a and 50b. Other control strategies are conceivable as well.

The brake system described here ensures an advantageous safety standard even in the event of a functional impairment of one of its brake circuits 10, 14 or 18:

If one of the two brake circuits 14 or 18 fails, the hydraulic sum brake pressure actively settable in first brake circuit 10 may be adapted accordingly. This allows for reliable braking on three wheels 12a, 12b, 16 or 20. In the event of a failure of first brake circuit 10, for example due to an electrical fault in the control, transmission or energy supply system, the brake system according to the present invention still has braking function by direct braking into the two brake circuits 14 and 18, which is boostable by brake booster 72.

It should be noted that the brake system shown in FIG. 1 does not require more than 12 valves 36a, 36b, 50a, 50b, 80, 88, 92, 104, 130, 134, 138 and 150, which are controllable/switchable by an electrical control signal/switching signal at least into an open state. Thus, in spite of the advantageous X brake circuit distribution, the high safety standard even in the event of a failure of one of brake circuits 10, 14 and 18, and the possibility of a wheel-specific setting of the hydraulic brake pressure on all wheels 12a, 12b, 16 and 18, it is possible to use a cost-effective control device for operating the represented brake system. The brake system of FIG. 1 is thus cost-effective to manufacture.

Figure 2:
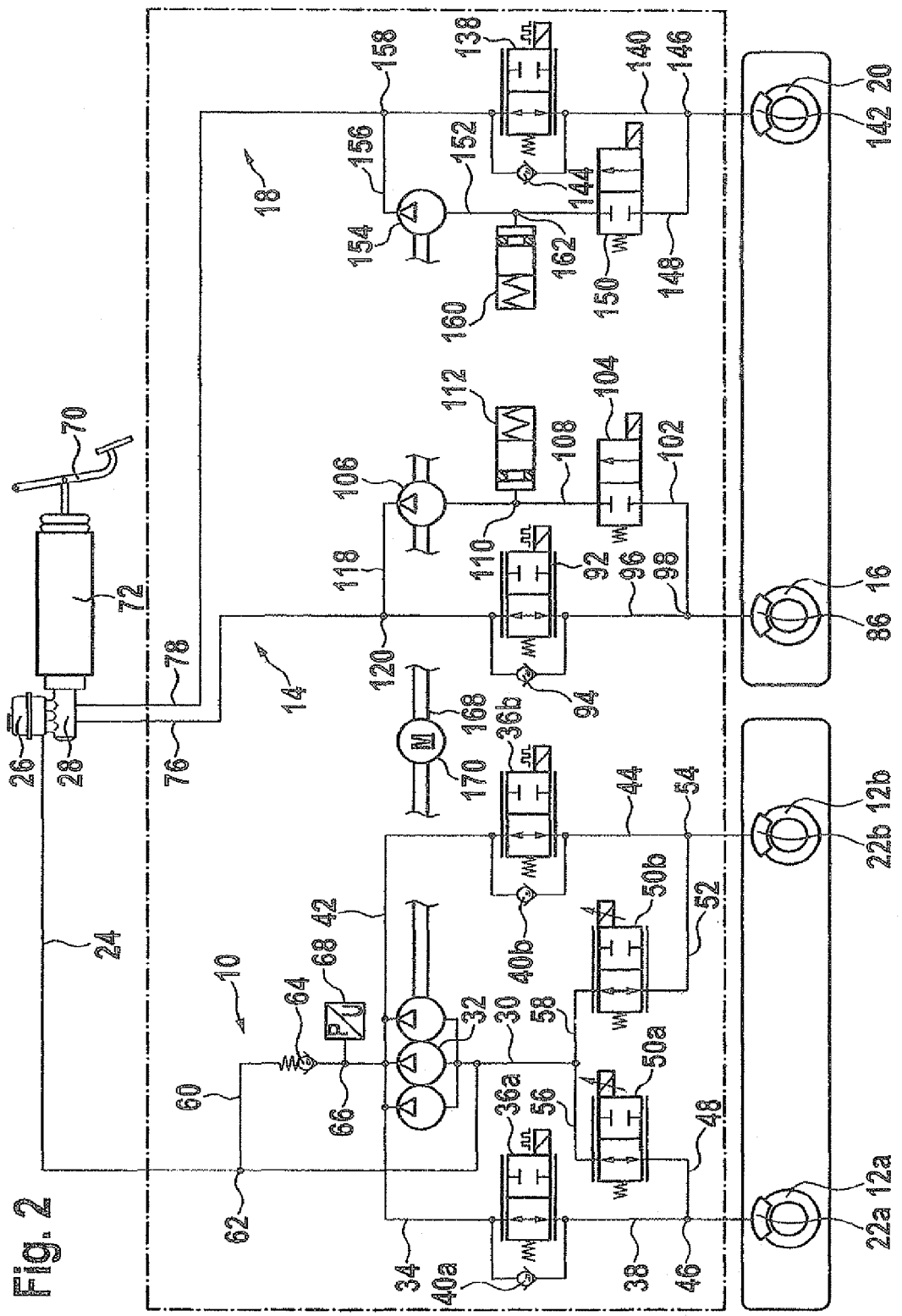
FIG. 2 shows a circuit diagram of a second specific embodiment of the brake system.

FIG. 2 shows a circuit diagram of a second specific embodiment of the brake system.

The brake system schematically shown in FIG. 2 shows a significant advantage of a continuously regulatable/controllable brake booster 72. Such a continuously regulatable and/or continuously controllable brake booster 72 may also be understood to include an active brake booster 72. For the continuously regulatable/controllable brake booster 72, it is possible to use, for example, a (classical) vacuum brake booster having a controllable actuating device, an electromechanical brake booster and/or another device for building up pressure without pedal actuation.

Due to the equipment of the brake system with a continuously regulatable/controllable brake booster 72, respectively one main switching valve and/or one switchover valve of the second brake circuit 14 and of the third brake circuit 18 may be eliminated. In addition, compared to the specific embodiment presented earlier, lines and junction points are eliminated as well. Each brake circuit 14 and 18 may have only one inlet valve 92 or 138 and one outlet valve 104 or 150 as controllable valves. The brake system equipped with the continuously regulatable/controllable brake booster 72 may thus be manufactured in a more cost-effective manner and requires less space.

The total number of controllable valves 36a, 36b, 50a, 50b, 92, 104, 138 and 150 of the brake system may thus be reduced to eight in a simple manner. For this reason, a cost-effective electronics is suitable to operate the brake system having a total of eight controllable valves 36a, 36b, 50a, 50b, 92, 104, 138 and 150.

For a quick pressure buildup in at least wheel brake cylinders 86 and 142, for example in an emergency braking situation, the advantageous brake pressure may be built up by simultaneously using the continuously regulatable/controllable brake booster 72 and at least one pump 106 and 154. Active pressure buildups, i.e. braking operations without an actuation of brake pedal 70, may also be performed using the continuously regulatable/controllable brake booster 72.

It should be noted that the usable continuously regulatable/controllable brake booster 72 may be realized in a smaller dimension and more cost-effectively because it is used to brake only two wheels 16 and 20.

Figure 3:
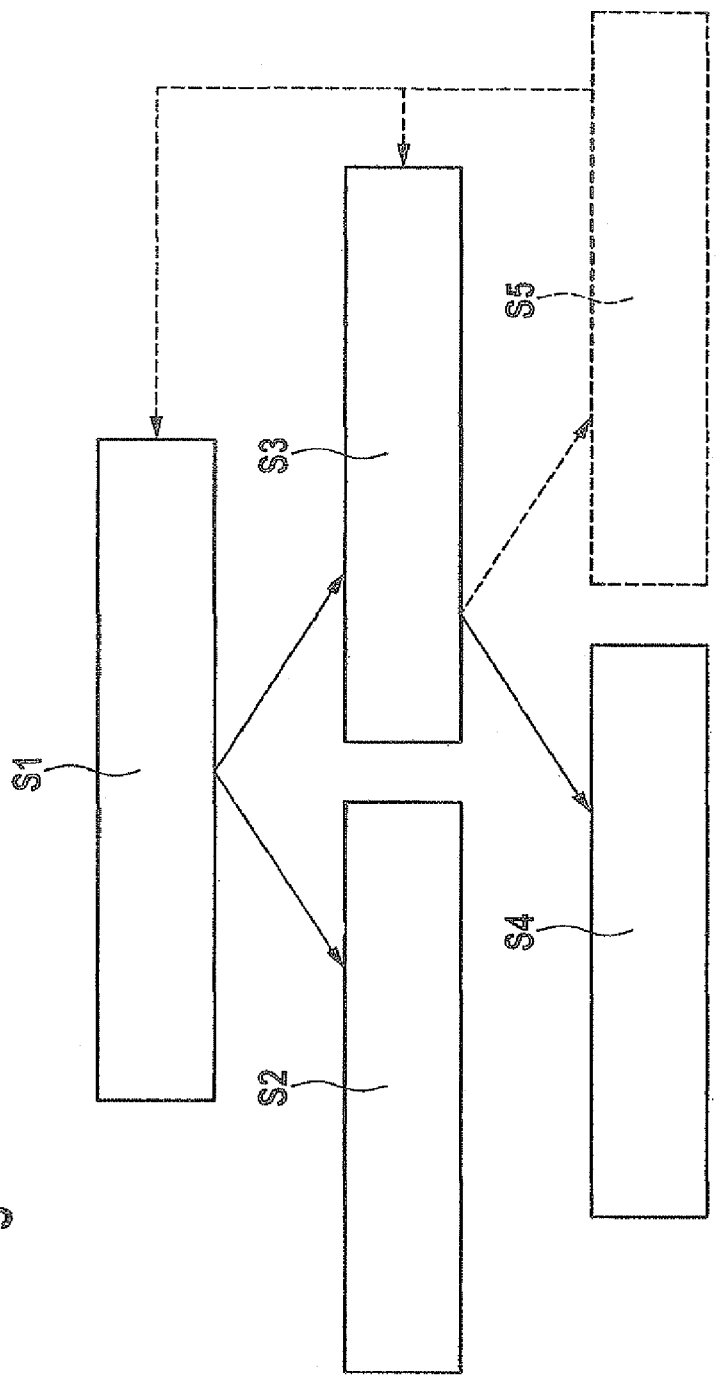
FIG. 3 shows a flow chart of one specific embodiment of the method.

FIG. 3 shows a flow chart of a specific embodiment of the method.

Using the method described below, a vehicle may be braked advantageously. For this purpose, a cost-effective brake system may be used. A suitable brake system comprises a master brake cylinder, a brake medium reservoir and at least one first brake circuit, which is connected to the brake medium reservoir via a reservoir line. The first brake circuit comprises a first wheel brake cylinder and a second wheel brake cylinder, a first wheel inlet valve associated with the first wheel brake cylinder and a second wheel inlet valve associated with the second wheel brake cylinder, a pump, by which a first brake medium volume may be pumped from the reservoir line through the open first wheel inlet valve into the first wheel brake cylinder and a second brake medium volume may be pumped from the reservoir line through the open second wheel inlet valve into the second wheel brake cylinder, a continuously adjustable first wheel outlet valve, by which a first brake medium displacement from the first wheel brake cylinder into the brake medium reservoir may be controlled, a continuously regulatable second wheel outlet valve, by which a second brake medium shift from the second wheel brake cylinder into the brake medium reservoir may be controlled, and a connecting line having a preferably spring-loaded non-return valve, via which a delivery side of the pump is connected to the brake medium reservoir. In this process, a brake medium displacement through the connecting line from the brake medium reservoir to the delivery side of the pump is prevented by the preferably spring-loaded non-return valve. The brake system described above may be used for example to carry out the method. The applicability of the method, however, is not limited to a brake system of this kind.

In a method step S1, it is ascertained whether the first wheel inlet valve is in an open state. If it is ascertained that the first wheel inlet valve is in the open state, then in a method step S2 a hydraulic sum braking torque of a first hydraulic braking torque exerted by the first wheel brake cylinder on a first wheel and a hydraulic braking torque exerted by the second wheel brake cylinder on a second wheel of the vehicle is changed by a setpoint difference. This occurs in method step S2 by controlling the first wheel outlet valve in such a way that the first hydraulic braking torque is changed by the setpoint difference.

If it is ascertained in method step S1 that the first wheel inlet valve is in a closed state, then the method step 3 described below is carried out instead of method step S2. In a method step S3, it is ascertained whether the second wheel inlet valve is in an open state.

If it is ascertained in the third method step that the second wheel inlet valve is in the open state, then the change of the hydraulic sum braking torque is performed by controlling the second wheel outlet valve in such a way that the second hydraulic braking torque and is changed by the setpoint difference is changed (method step S4). If it is ascertained in method step S3 that the second wheel inlet valve is in a closed state, then in an optional method step S5 a predetermined waiting time may be maintained before the method step S1 or the method step S3 is repeated.

The method described here is readily implementable. As a result, the advantages already mentioned above are also able to be realized by the method.

What is claimed is:

1. A brake system for a vehicle, comprising:
   a master brake cylinder;
   a brake medium reservoir; and
   a first brake circuit, which is connected via a reservoir line to the brake medium reservoir, including at least one first wheel brake cylinder, a first wheel inlet valve associated with the first wheel brake cylinder, a first pump, and a first wheel outlet valve associated with the first wheel brake cylinder,
      wherein, using the first pump, a first brake medium volume is able to be pumped from the reservoir line through the open first wheel inlet valve into the first wheel brake cylinder, wherein the first wheel outlet valve is a continuously adjustable first wheel outlet valve, by which a first brake medium displacement from the first wheel brake cylinder into the brake medium reservoir is controllable;

a connecting line having a non-return valve, via which a delivery side of the first pump is connected to the brake medium reservoir, wherein a brake medium displacement from the brake medium reservoir to the delivery side of the first pump is prevented by the non-return valve; and at least one second brake circuit having a second wheel brake cylinder, the second brake circuit being hydraulically connected via a first line to the master brake cylinder so that via a first pressure increase in an inner volume of the master brake cylinder, a second pressure increase is producible in an inner volume of the second wheel brake cylinder, wherein the first wheel inlet valve is connected to the brake medium reservoir via the non-return valve.

2. The brake system of claim 1, further comprising:
a third brake circuit having a third wheel brake cylinder, the third brake circuit being hydraulically connected via a second line to the master brake cylinder so that via the first pressure increase in the inner volume of the master brake cylinder, a third pressure increase is producible in an inner volume of the third wheel brake cylinder.

3. The brake system of claim 2, wherein at least one of the following is satisfied: (i) the second brake circuit includes exactly two controllable valves, and (ii) the third brake circuit includes exactly two controllable valves.

4. The brake system of claim 1, further comprising:
at least one of a continuously regulatable and continuously controllable brake booster.

5. The brake system of claim 1, wherein the second brake circuit also includes at least one of a main switching valve and a switchover valve.

6. The brake system of claim 1, wherein the second brake circuit includes:
a second wheel inlet valve associated with the second wheel brake cylinder;
a second pump, by which a third brake medium volume is pumpable from the master brake cylinder through the main switching valve and the second wheel inlet valve into the second wheel brake cylinder when the main switching valve and the second wheel inlet valve are open;
a first storage chamber; and
a second wheel outlet valve, by which a third brake medium displacement from the second wheel brake cylinder into the first storage chamber is controllable.

7. The brake system of claim 6, wherein at least the first pump and the second pump are situated on a common shaft of a motor.

8. The brake system of claim 1, wherein the brake system includes exactly twelve controllable valves, which are controllable at least into an open state and into a closed state via an electrical signal provided by a control device of the brake system.

9. The brake system of claim 1, further comprising:
a recuperative braking device, which is a generator, by which a first generator braking torque is exertable on a first wheel associated with the first wheel brake cylinder and a second generator braking torque is exertable on a second wheel associated with a fourth wheel brake cylinder,
wherein the first brake circuit includes the first and fourth wheel brake cylinders.

10. A brake system for a vehicle, comprising:
a master brake cylinder;
a brake medium reservoir; and
a first brake circuit, which is connected via a reservoir line to the brake medium reservoir, including at least one first wheel brake cylinder, a second wheel brake cylinder, a first wheel inlet valve associated with the first wheel brake cylinder, a first pump, a first wheel outlet valve associated with the first wheel brake cylinder, a second wheel outlet valve associated with the second wheel brake cylinder;
wherein, using the first pump, a first brake medium volume is able to be pumped from the reservoir line through the open first wheel inlet valve into the first wheel brake cylinder,
wherein the first wheel outlet valve is a continuously adjustable first wheel outlet valve, by which a first brake medium displacement from the first wheel brake cylinder into the brake medium reservoir is controllable; and
a connecting line having a non-return valve, via which a delivery side of the first pump is connected to the brake medium reservoir, wherein a brake medium displacement from the brake medium reservoir to the delivery side of the first pump is prevented by the non-return valve;
wherein the reservoir line is directly coupled to a third line, the intake side of the first pump being coupled to a first end of the third line, and wherein a fourth line directly connects the first wheel outlet valve to a second end of the third line facing away from the first pump, and wherein a fifth line from the second wheel outlet valve is directly connected to the second end of the third line facing away from the first pump.

* * * * *